July 27, 1926.

C. K. TETER 1,593,680

APPARATUS FOR ADMINISTERING ANÆSTHETICS

Filed Jan. 13, 1922

INVENTOR
CHARLES K. TETER
BY
A. E. Merkel, ATTORNEY.

July 27, 1926.

C. K. TETER 1,593,680

APPARATUS FOR ADMINISTERING ANÆSTHETICS

Filed Jan. 13, 1922      2 Sheets-Sheet 2

INVENTOR:
CHARLES K. TETER
BY
ATTORNEY.

Patented July 27, 1926.

1,593,680

UNITED STATES PATENT OFFICE.

CHARLES K. TETER, OF CLEVELAND HEIGHTS, OHIO, ASSIGNOR TO THE TETER MANUFACTURING COMPANY, OF CLEVELAND, OHIO, A CORPORATION OF OHIO.

APPARATUS FOR ADMINISTERING ANÆSTHETICS.

Application filed January 13, 1922. Serial No. 528,903.

This invention relates to apparatus for administering anæsthetics, more particularly to apparatus for administering a mixture of gases such for instance as nitrous oxide and oxygen to induce analgesia or anæsthesia.

The principal object of this invention is to provide improved means for indicating the relative proportions of the gases being supplied to the patient, said means being sensitive and quickly responsive to slight variations in pressure, together with flow regulating means enabling the operator to quickly adjust the rate of flow of the gases to maintain a mixture of the desired proportions or to quickly vary the proportions of the mixture to control the condition of the patient during an operation. Further objects will be apparent from the following description, together with the annexed drawings.

The annexed drawings and following description set forth in detail certain means embodying my invention, the disclosed means, however, constituting but one of the various mechanical forms in which the principle of the invention may be employed.

In said annexed drawings:—

Figs. 5 and 6 are detail views showing a side and end elevation, respectively of the float forming a part of the check valve at the upper ends of the mercury indicator tubes.

Figure 2:
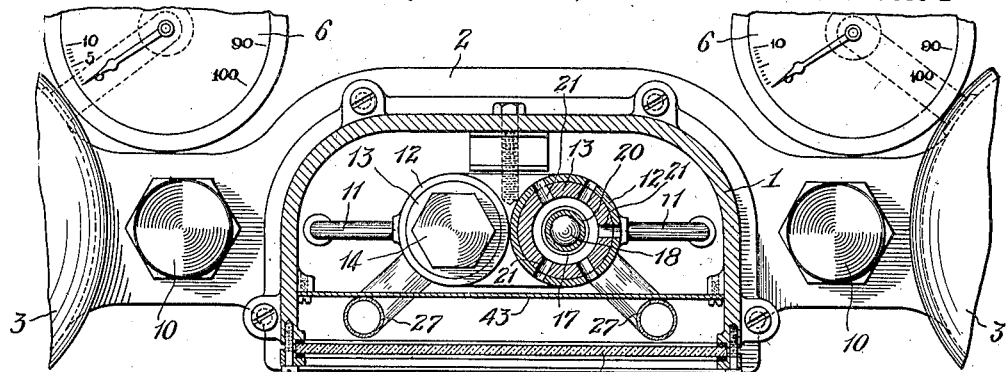
Fig. 2 is a sectional view taken on line II—II of Fig. 1.

Referring to the annexed drawings, the gas mixing chamber 1 is mounted upon a casting 2 connecting the pressure reducing valves 3, which are of the usual construction and which are provided with clamping yokes 4 adapted to receive the necks of gas containers 5 which supply the gas to the apparatus through the reducing valves 3. The construction of the reducing valves 3 and the connection of the containers thereto is well known, therefore a detailed description thereof is deemed unnecessary. As well understood in the art the valves 3 are adapted to be adjusted to deliver gas slowly at the desired low pressure and are provided with gauges 6 which indicate the pressure at which the gas is delivered from the reducing valves. Gases, such as oxygen and nitrous oxide are delivered from the reducing valves 3 into the mixing chamber 1 and pass from the mixing chamber through the passage 7 in the casting 2 to the breathing apparatus. Gases from each of the reducing valves 3 pass through offset passages 8 and 9 in the casting 2 between which are interposed needle valves 10 for regulating the rate of flow of the gases from the reducing valves. The passages 9 communicate with conduits 11 within the mixing chamber 1.

In order to obtain a mixture of the two gases in the desired proportions I have provided mercury column indicators within the mixing chamber which register the pressure, with respect to the gases in the mixing chamber, at which each of the gases enter the mixing chamber. The two pressure gauges are of identical construction. A description of one will therefore suffice for both. A cylindrical casing 12, suitably supported in vertical position within the chamber 1, is connected to the conduit 11 and has a valve mounted at its upper end for regulating the flow of gas into the mixing chamber. The upper end of the casing 12 is closed by a plug 13 which is counterbored to form a valve chamber and tapped to receive a threaded plug 14. The plug 13 has a radial passage 15 registering with the conduit 11 and an axial passage 16 with which the passage 15 communicates. The upper end of the passage 16 has a bell mouth outlet portion 17 in the bottom of the counterbore of the plug 13 forming a conical seat for a metal ball 18. The lower portion of the plug 14 is formed to provide a cup shaped ball seat 20 for the ball adapted to guide the ball and limit its upward movement. The plug 14 is adjusted to permit the ball 18 to move upwardly off its conical seat 17 a slight distance. Passages 21 are provided through the casing 12 and the cylindrical wall of the closure plug 13 to permit the gas which escapes past the ball 18 to pass freely into the mixing chamber 1. The closure plug 13 has an axial depending stem 22 in which is formed a passage 23 communicating with the axial passage 16 and opening into a pressure chamber 24 in the casing 12 below the closure plug 13. The lower end of the stem 22 is flanged to provide a horizontal plate portion 25, the purpose of which will be hereinafter set forth. The casing 12 has at its lower end a neck portion 26 of reduced diameter in which is fitted the upper end of the short leg of a bent glass gauge tube 27. The front wall of the mixing chamber 1 consists of a glass panel 28 secured in place by suitable clamping and sealing strips.

The long leg of the gauge tube 27 extends vertically just inside the glass panel 28 to adjacent the top of the mixing chamber. Mounted on the upper end of the gauge tube 27 is a cylindrical valve casing 29 having transverse upper and lower partitions 30 and 31 therein. The lower end of the casing 29 fits over the upper end of the tube 27 with the partition 31 resting upon the upper end of the tube. The partition members 30 and 31 are provided with axial openings 32 and 33. Normally seated by gravity upon the lower partition member 31 is a metal float 34 having a flat base and a conical upper end. The float 34 has a diameter slightly less than the internal diameter of the casing 29 and is provided with a groove 35 across the base and vertical grooves 36 on opposite sides at the ends of the groove 35. The upper end of the casing 29 is closed by a plug 37 having an opening 38 therethrough and provided with a depending stem 39 flanged at its lower end to form a baffle plate 40 directly over the axial opening 32 in the upper partition 30. The casing 29 projects through a threaded opening 41 in the top of the chamber 1 and is enclosed by a cylindrical cap 42 which screws into the opening 41. The diameter and height of the cap 42 is such that sufficient clearance is provided to permit free passage of gas between the mixing chamber and the casing 29. Mercury is introduced into the gauge tube 27 by removing the cap 42 and plug 37 and pouring into the upper end of the casing 29.

Immediately behind the long leg of the gauge tube 27 is a plate 43 fastened to the opposite side walls of the chamber 1. A suitable scale for each of the mercury columns is marked on the plate 43 adjacent each tube 27. An amount of mercury is introduced into each gauge tube such that when there is no difference in pressure between the mixing chamber 1 and the pressure chamber 24 the tops of the mercury columns will be even with the zero marks on the scales and at a corresponding level in the chamber 24.

Figure 1:
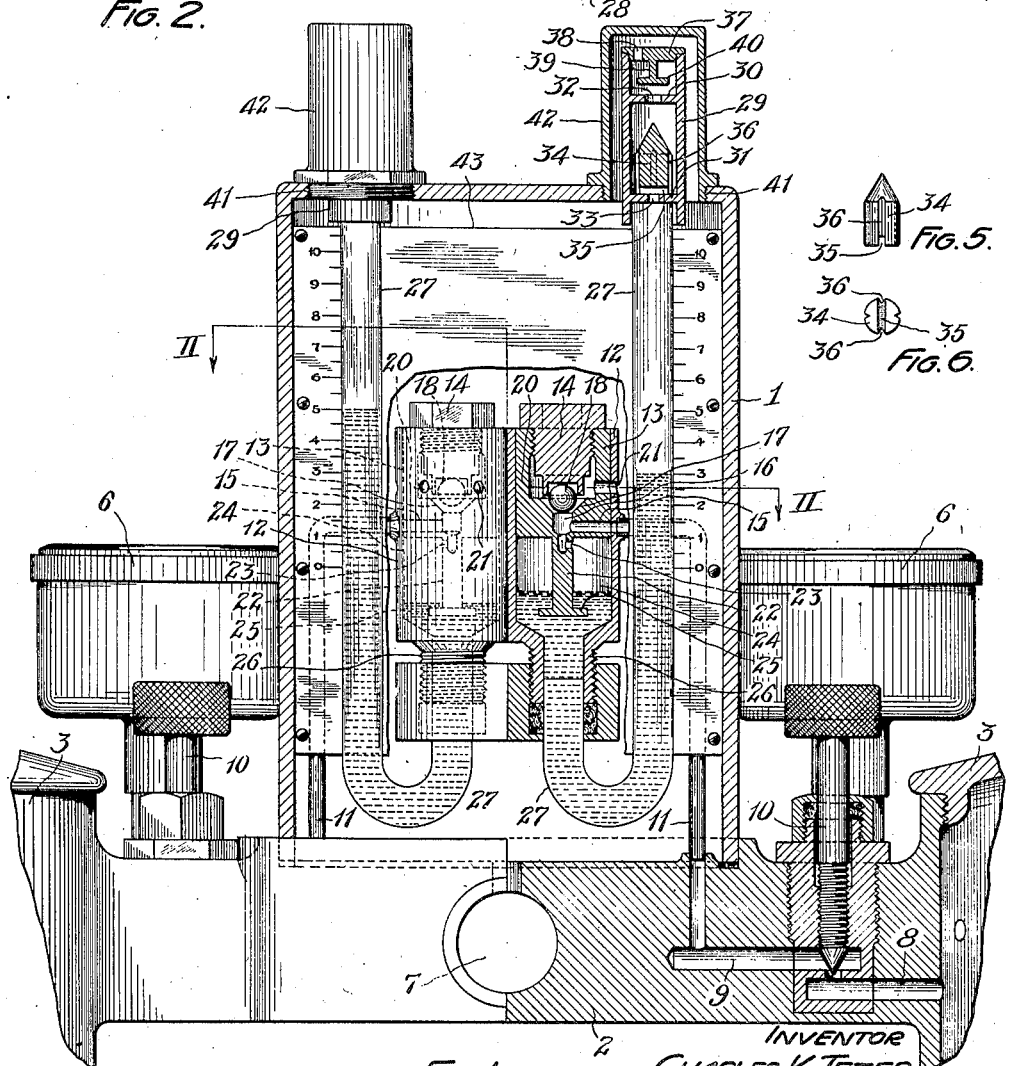
Fig. 1 is a view partly in side elevation and partly in vertical section of the gas mixing chamber and improved indicating devices associated therewith.
Figure 3:
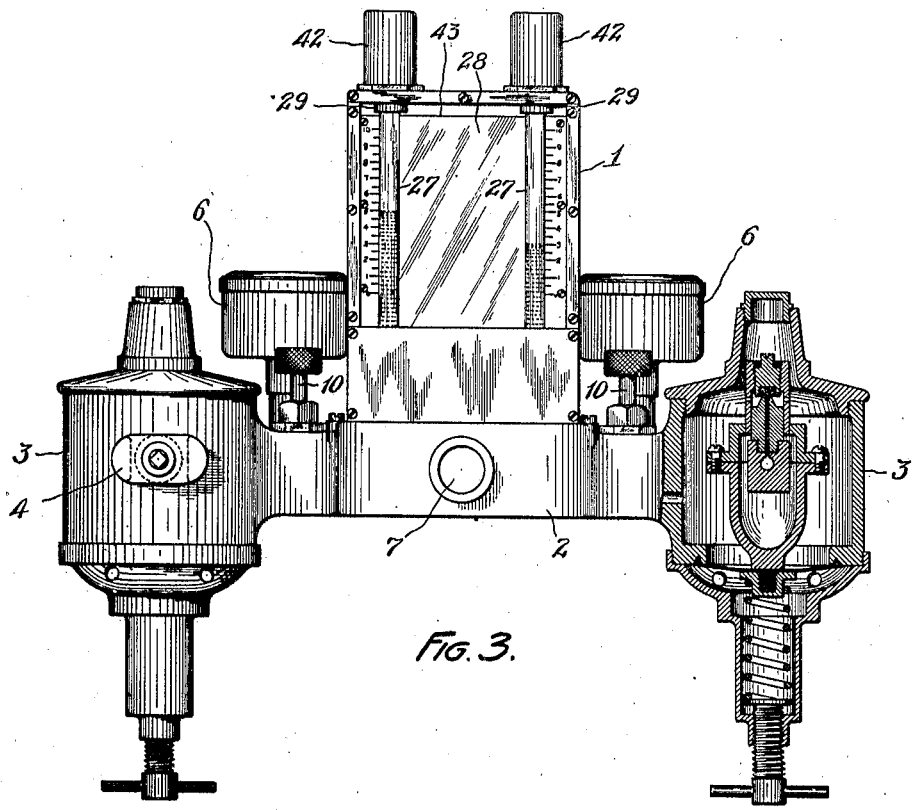
Fig. 3 is a side elevation of the mixing chamber and pressure regulating valves through which the gases are supplied thereto, one of said regulating valves being shown in section.
Figure 4:
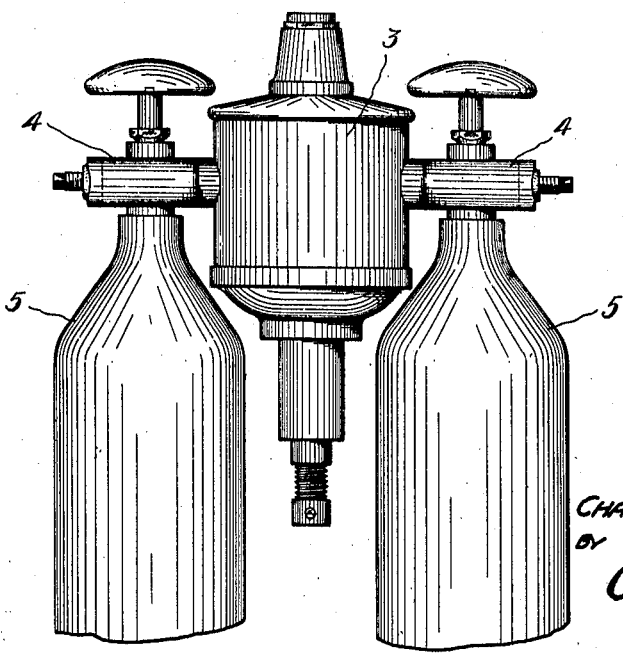
Fig. 4 is a side elevation showing one of the pressure regulating valves with gas containers attached thereto.

When a flow of gas is established from the containers 5 through the reducing valves 3, passages 8 and 9, conduit 11 and passages 15, 16 and 23 to the pressure chamber 24, the pressure in the chamber 24 will gradually build up forcing the mercury out of the chamber into the tube 27, gradually increasing the height of the indicating columns. As the pressures in the chamber 24 increase the balls 18 will be gradually lifted from their seats until they are seated against the seats in the lower ends of the plugs 14 permitting the gases to flow into the chamber 1. Since free passages for gas are provided from the interior of each tube 27 through the opening 33, along grooves 35 and 36 in the float 34, opening 32 in partition 30, and opening 38 in plug 37 and between casing 29 and cap 42 to the mixing chamber, each mercury column will register the difference in pressure between the mixing chamber 1 and the pressure chamber 24, indicating the head or pressure at which each of the gases enters the mixing chamber. It will be apparent that the relative amount of each gas in the mixing chamber will be substantially proportional to the pressures in the pressure chambers 24 and to the cross sectional area of the orifices around the two balls 18. Since normally a larger proportion of nitrous oxide is required the upper ball seat in the gauge connected with the nitrous oxide containers will preferably be set somewhat higher than in the gauge connected to the oxygen containers, as is shown in dotted lines at the left in Fig. 1. By providing an open communication, as shown, between the end of the inlet passages and the pressure chambers, and providing a valve controlled communication between the end of said inlet passage and mixing chamber, it will be seen that gases at low pressure and coming from said passages will first enter the pressure chambers before they pass the valves 18 into the mixing chamber. These low pressures will therefore be more readily recorded or indicated than would be the case if there were no obstruction to the communication with the mixing chamber, for the reason that the capacity of the pressure chambers is very much less than the capacity of the mixing chamber, all as will be readily understood by those skilled in the art.

The plugs 14 will be adjusted to provide a predetermined proportion of gases when the two mercury columns are at equal heights. By adjusting the needle valves 10 the flow of gas to each of the pressure chambers 24 can be quickly regulated to maintain the desired pressure. When it is desired to vary the proportions of the two gases the needle valves 10 can be adjusted to vary the pressure of the two gases until the relative readings for the two mercury columns is such as to indicate the desired proportions in the mixture.

The purpose of the plate 25 which is suspended in the chamber 24 beneath the surface of the mercury is to prevent wave motion at the surface of the mercury which otherwise would occur due to fluctuations in pressure and which would transmit a vibratory movement to the indicating column. The plate 25 also serves as a baffle plate to prevent the mercury from rushing upwardly in the chamber 24 into the passages formed in the plug 13 as might otherwise occur in the event that there is a sudden drop in the pressure in the mixing chamber 1.

The containers for oxygen and nitrous oxide are ordinarily painted red and black respectively, and the respective mercury columns for the two gases may have corresponding colors or the respective colors may appear on the indicating plate.

Should the pressure in either of the pressure chambers 24 rise sufficiently to cause the mercury to rise above the top of the tube 27 into the casing 29, the float 34 will be carried up into engagement with the opening 32 in the partition 30 to prevent the escape of mercury through the said opening 32. The baffle plate 40 directly over the opening 32 serves as an obstruction to any mercury which might spurt past the float 34 before the same becomes fully seated in the opening 32.

Having fully described my invention, what I claim and desire to secure by Letters Patent is:—

In an apparatus of the character described, the combination of a mixing chamber; means for supplying gases thereto comprising passages having upwardly directed bell mouth outlet openings communicating with said chamber and means for supplying gases under pressure to said passages and regulating the flow thereof; a ball adapted to seat by gravity in each of said bell mouth outlet openings and adapted to be lifted off the seat by the pressure of the gas in said passages; means for limiting the movement of said balls; and pressure indicators for registering the differences in pressure between the gases in said mixing chamber and in each of said passages adjacent the outlets thereof; each such indicator consisting of a bent tube having two upright legs of unequal length, the shorter of such legs having a pressure chamber of enlarged diameter at the upper end thereof, and the longer of said legs communicating at its upper end with said mixing chamber, said tube having a body of liquid therein normally at a level to partially fill said pressure chamber; said passages also communicating with said pressure chamber.

Signed by me this 15th day of December, 1921.

CHARLES K. TETER.